us006177114B1

United States Patent
Unnithan

(10) Patent No.: US 6,177,114 B1
(45) Date of Patent: *Jan. 23, 2001

(54) REFINING OF EDIBLE OIL RICH IN NATURAL CAROTENES AND VITAMIN E

(75) Inventor: Unnikrishnan Ramachandran Unnithan, Johor Darul Takzim (MY)

(73) Assignee: Carotina SDN. BHD. (MY)

( * ) Notice: Under 35 U.S.C. 154(b), the term of this patent shall be extended for 0 days.

This patent is subject to a terminal disclaimer.

(21) Appl. No.: 09/358,950

(22) Filed: Jul. 22, 1999

Related U.S. Application Data

(63) Continuation-in-part of application No. 08/745,569, filed on Nov. 8, 1996, now Pat. No. 5,932,261.

(30) Foreign Application Priority Data

Oct. 31, 1996 (MY) ............................................ PI 9604534

(51) Int. Cl.[7] ...................................................... A23D 9/00
(52) U.S. Cl. .......................... 426/417; 426/488; 426/492; 426/601; 554/29; 203/86
(58) Field of Search .................................. 426/417, 488, 426/492, 601; 554/29; 203/86

(56) References Cited

U.S. PATENT DOCUMENTS

| 4,004,041 | 1/1977 | Kostowsky | 426/417 |
|---|---|---|---|
| 4,036,865 | 7/1977 | Hartman | 426/488 |
| 4,126,709 | 11/1978 | Johnson | 426/492 |
| 4,789,554 | 12/1988 | Scavone | 426/487 |
| 4,804,555 | 2/1989 | Marschner | 426/488 |
| 4,810,330 | 3/1989 | Stage | 426/488 |
| 5,019,668 | 5/1991 | Keat | 426/540 |
| 5,045,200 | 9/1991 | Brook | 426/417 |
| 5,073,389 | 12/1991 | Kuss | 426/417 |
| 5,374,751 | 12/1994 | Cheng | 426/488 |
| 5,405,633 | 4/1995 | Heidlas | 426/417 |
| 5,932,261 * | 8/1999 | Unnithan | 426/417 |
| 6,072,092 * | 6/2000 | Ooi | 585/351 |

FOREIGN PATENT DOCUMENTS

31084/89 * 9/1989 (AU) .

OTHER PUBLICATIONS

Brochure, "Short–Path Distillation: From Laboratory to Production." UIC, Inc., Joliet, Illinois (1990).
Brooker, S.G. et al. "The Deacidification of Coconut Oil by Short–Path Distillation." *New Zealand J. Science and Technology* 33B (488):488–92 (1952).
Hartman, L. "Desacidificazione di oli commestibili con la distillazione a corta distanza." *La Rivista Delle Sostanze Grasse* 55 (6):191–92 (1967).
Hollo, J. et al. "Possibillita della distillazione molecolare come metodo di separazione nell'industria degli oli vegitali." *La Rivista Delle Sostanze Grasse* 55 (6):249–59 (1967).
Ooi, C.K. et al. "Recovery of Carotenoids from Palm Oil." JAOCS 71 (4):423–26 (1994).
Ooi, T.L. et al. Extraction of Carotenes from Palm Oil,: JJOCS 35 (7):543–48 (1986).
Tandy, D.C. et al. "Physical Refining of Edible Oil." JAOCS 61(7) 1253–58 (1984).

* cited by examiner

*Primary Examiner*—Carolyn Paden
(74) *Attorney, Agent, or Firm*—Townsend and Townsend and Crew LLP

(57) ABSTRACT

A process for the production of a natural carotene rich refined and deodorized oil by subjecting the oil to a pressure of less than 0.060 mbar and to a temperature of less than 200° C., wherein the process includes distilling the oil in a short-path distiller at a temperature range between about 160° C. to about 290° C. and at pressures of 0.003 mbar to 0.08 mbar and removing free fatty acids (FFA) in the oil by condensation within the distiller. The FFA is removed by subjecting the mixture of the oil and the FFA to an internal condenser system operating at a temperature greater than the melting point of FFA in the oil. The process yields in refined, deodorized oil, in particular palm oil where the carotene and Vitamin E contained the feed oil is substantially retained in the processed oil.

22 Claims, No Drawings

REFINING OF EDIBLE OIL RICH IN NATURAL CAROTENES AND VITAMIN E

CROSS-REFERENCES TO RELATED APPLICATIONS

This application is a Continuation-in-Part of application Ser. No. 08/745,569, filed Nov. 8, 1996, now U.S. Pat. No. 5,932,261, the teachings of which are hereby incorporated by reference for all purposes.

FIELD OF INVENTION

This invention relates to a process of refining edible oil rich in naturally occurring carotenes and Vitamin E whereby substantially a large percentage of the naturally occurring carotenes and Vitamin E is retained in the refined oil. More particularly, the invention relates to a process of refining palm oil whereby substantially a large percentage of the naturally occurring carotenes and Vitamin E is retained in the refined oil.

BACKGROUND OF THE INVENTION

It is a known fact that crude palm oil is rich in carotenes, a class of $C_{40}$ polyunsaturated hydrocarbons. Commercially cultivated oil palm yields crude palm oil which contains 500–700 ppm carotenes of which $\alpha$ and $\beta$ carotenes comprise 90% of the total carotenes. However, newer clones or new species of oil palm trees can produce crude palm oil with carotene concentrations of 1000–3000 ppm. The carotenes are known to posses pro-vitamin A properties and recent findings have shown that $\beta$-carotene also inhibits tumor progression and hence, reduces cancer formation in animals, including humans. At present, edible palm oil is used in the refined, bleached and deodorized form. However, the refining process of producing refined, bleached and deodorized form of oil commonly adopted in palm oil refining industry results in the carotenes being destroyed, while the oil is being deodorized and deacidified. The refined oil of the prior art process normally has a free fatty acid (FFA) content of less than 0.1%, carotene content of less than 20 ppm and color of less than 3 red in a 5 ¼" cell (Lovibond Scale). Prior art refining process of crude palm oil in summary involved, deodorizing at temperatures between 240° C.–260° C. and at a pressure of 1–3 torr which processes resulted in not only the removal of unwanted fatty acids, but also all carotenes being destroyed. Moreover, $\alpha$-, $\beta$-,$\gamma$-, and z-(zeta), zeacarotene, cis $\alpha$-carotene, cis $\beta$-carotene and lycopene are all destroyed.

In prior art plant configurations, degassing of the crude palm oil and deodorizing of the degassed oil is done within the same equipment. The typical operating temperature is between 240° C.–260° C. At these temperature levels, unwanted free fatty acids (FFA) are removed. However, all the carotenes are also broken down. If the operating temperature is lowered, the FFA are not completely removed to meet the specification stipulated for edible oil. The end product is not completely deodorized and the taste is not bland.

In recent times, attempts have been made to produce refined palm oil wherein the naturally occurring carotenes and Vitamin E are retained in substantially large quantities. For example, Australia Patent No. AU-B-31084189 (AU'189) granted to Palm Oil Research Institute of Malaysia, discloses an improved process for the refining of edible palm oil substantially without destroying the carotenes present in the oil. The prior art process comprises the step of subjecting the oil to a pressure of less then 0.060 Torr and a temperature of less than 200° C. According to this prior art invention, palm oil or a product of palm oil is passed through a deodorizer, preferably at a temperature in the range 100° C.–200° C. and at a pressure in the range of 0.003–0.06 Torr. During this process, the free fatty acids are distilled over and the oil deodorized, but the carotenes are not destroyed. This deodorized palm oil has a free fatty acid content of less than 0.12%. Carotene content and peroxide values are almost the same as before the process. The refined oil has a bland smell. The examples disclosed in the Australia patent are restricted to a laboratory scale. However, on repeating the Australian process on a pilot plant scale or on a commercial plant scale, the FFA and carotene content changed dramatically. It was not possible to obtain yields of refined palm oil with the characteristics disclosed in the AU'189 on a scale greater than simple laboratory amounts, which are less than 10 kg/hr.

It is believed that gas, lights and free fatty acids at the molecular distillation stage create a strain on the distillation process. Increasing the operating temperature at the molecular distiller reduces the level of FFA in the refined oil, but at the same time destroys the carotene content in the oil. At operating temperatures between 100° C.–200° C. and at 0.003–0.060 Torr, all the FFA is not removed due to inefficient removal of condensed FFA in the condensation column.

In view of the foregoing, what is needed in the art is a refining process wherein the FFA are removed to an acceptable level, the oil is deodorized to an acceptable level and the oil is rendered tasteless. Moreover, a refining process is needed wherein the level of the carotene and Vitamin E present in the preprocessed crude palm oil is retained in the refined oil and the crude palm oil is refined at a rate greater than laboratory scale. The present invention fulfills these and other needs.

SUMMARY OF THE INVENTION

The present invention provides a commercial process for the production of refined palm oil rich in natural carotene and Vitamin E. The process for the production of natural carotene rich, refined and deodorized oil includes distilling the oil in a short path distillator at a temperature range of 160° C. to 210° C., and at pressures of 0.003 mbar to 0.08 mbar, and removing free fatty acids (FFA) in the oil by condensation in the distiller. The FFA are removed by subjecting the mixture of the oil and FFA to an internal condenser system operating at a temperature greater than the melting point of FFA in the oil, typically operating at a temperature range of 20° C. to 80° C. The FFA in the oil is removed from the distiller by condensing FFA vapors immediately upon the oil and the vaporized FFA being introduced into the distiller.

DESCRIPTION OF THE SPECIFIC EMBODIMENTS

Current refining processes of natural carotene rich and deodorized palm oil are limited to small scale production. Larger scale refining processes do not retain the naturally occurring carotenes and Vitamin E in sufficient quantity to meet regulatory requirements. Surprisingly, it has been found that a commercial scale process, wherein the pretreated crude oil is distilled in a short path distiller at a temperature range between about 160° C. to about 210° C. and pressures between about 0.003 mbar to about 0.08 mbar and wherein free fatty acids (FFA) in the oil are removed by condensation in the distiller produces a refined oil wherein the carotene and Vitamin E content is retained in substantially high level and the oil is produced in a large quantities to be commercially useful.

The present invention provides a palm oil refining process at commercial scale processing rates. The processing rate is the amount of oil (by weight) that is processed over a unit of time. The commercial rate is defined as a rate where the production of refined oil is of a high enough quantity to be commercially useful. As used herein, the commercial rate is between about 100 kg/hr to about 15,000 kg/hr. However, optimum retention of carotenes and Vitamin E would result when the crude oil is refined at a preferred rate of between about 100 kg/hr to about 5,000 kg/hr, and more preferably between about 100 kg/hr to about 2000 kg/hr.

The disclosed method of oil refining makes use of a distiller which comprises a condenser. The condenser system within the distiller incorporates a flow therethrough of tempered water and wherein the temperature of the tempered water is marginally greater than the melting point of FFA.

The oil that is introduced into the distiller unit is preferably preheated to about 160° C. and has preferably been degassed and degummed. This oil can be any of the following including, but not limited to, degummed palm oil, degummed palm olein, degummed palm stearin, degummed palm mid-fraction, degummed super olein, crude palm mid-fraction and crude palm super olein, crude palm olein, crude palm stearin, crude palm oil or hybrid palm oil.

The invention further provides a distiller for the production of natural carotene and Vitamin E rich refined and deodorized oil wherein the distiller includes an internal condensing system to remove condensed FFA from the distiller.

In one embodiment of the invention, pretreated (degummed) crude palm oil or olein or stearin is pumped from an external storage tank at a temperature between about 30° C. to about 50° C. via a steam heated preheater into a degasser equipment with or without a reflux condenser unit. The oil in the preheater is heated to, and maintained at a temperature between about 80° C. to about 160° C. The operating pressure in the degasser unit is maintained between about 0.5 mbar to about 5 mbar. Under these temperature and pressure conditions, diluted gas, lights and some fatty acids are evaporated. These evaporated vapors pass into a cooled reflux condenser unit cooled by water in a temperature range between about 20° C. to about 60° C., whereby the fatty acids are condensed back in the degasser packings.

The rest of the vapors are condensed in an external cooled condenser at a temperature between about −5° C. to about +15° C. The degassed oil is pumped via another steam heated preheater where the temperature is between about 160° C. to about 180° C. It is then pumped into a short-path distiller (molecular distiller) where at a temperature between about 160° C. to about 210° C. and a pressure between 0.003 to about 0.08 mbar where the fatty acids are distilled off. These fatty acids are condensed in an internal condenser (within the short-path distiller) which is cooled by water maintained at a temperature between about 35° C. to about 80° C. Preferably, the FFA in the oil is removed from the distiller by condensing FFA vapors immediately upon the oil with FFA being introduced into the distiller. The fatty acids condensed on the internal condenser are collected in a separate receiver and pumped to a storage tank by a discharge pump.

The residue from the distiller is pumped to a storage tank after cooling in a cooler to between about 50° C. to about 70° C. The residue is refined palm oil rich in natural carotenes and Vitamin E. The refined oil has a free fatty acid content of less than 0.08% and is odorless and tasteless. The peroxide value of this refined oil is in the range between about 0 meq/kg to about 1.0 meq/kg and has a minimum carotene content of 500 ppm and Vitamin E (tocopherols and tocotrienols) of 800 ppm. The loss of carotenes and Vitamin E during the process varies between about 0 to about 10%. The distillate (palm fatty acid distillate) has a carotene content of 30 ppm maximum and Vitamin E content between about 1000 to about 2500 ppm maximum and minimum 90% FFA. The color of the residue is in the range of 19R to 25R in a 5 ¼" Lovibond Scale.

The distillation process requires different vacuums at different stages. The vacuum system is a combination of several vacuum pumps in series and in parallel. The operating vacuum pump for the distiller is an oil vapor jet vacuum pump. This pump is cooled by a special cooling water circuit. The cooling water inlet is maintained at 4–6 bar and at a temperature between about 20° C. to about 30° C. The rest of the vacuum system consists of a series of Roots blowers and a liquid ring vacuum pump.

The vacuum system is protected by cold traps with different cooling coils wherein the temperatures of the coolant is maintained at various temperatures between about −15° C. to about +60° C. For heating the distiller, a USDA approved heating fluid (Food grade) is used.

The present invention will be illustrated and not limited by the following Examples.

EXAMPLE 1

Preheated (Degummed) Crude Palm Oil was preheated to 120° C. and degassed in the Degasser at 1 mbar pressure and passed through the Short-Path Distiller at the rate of 2000 kg/hr at a pressure of 0.008 mbar. The temperature of the water to the internal condenser was maintained at 57° C., through a temperature control system. The distiller temperature was maintained at 180° C. The natural carotene & vitamin E rich refined and deodorized oil and Palm Fatty Acid Distillate (PFAD) was found to have the characteristics as shown in Table 1.

TABLE 1

|  | Peroxide Value meq/kg | FFA % | Total Carotenes Content ppm | Vit E ppm |
| --- | --- | --- | --- | --- |
| Pretreated (Degummed) Crude Palm Oil | 0.19 | 3.39 | 523 | 958 |
| Natural Carotene & Vitamin E rich refined & deodorized palm oil | Nil | 0.076 | 502 | 944 |
| PFAD | — | 90.50 | 28 | 1584 |

EXAMPLE 2

Pretreated (Degummed) Crude Palm Oil was preheated to 100° C. and degassed in the Degasser at 0.8 mbar pressure and passed through the Short Path Distiller at the rate of 1000 kg/hr at a pressure of 0.005 mbar. The distiller temperature was maintained at 175° C. The tempered water temperature to the internal condenser was maintained at 57° C. The natural carotene & vitamin E rich refined and deodorized oil and PFAD was found to have the characteristics as shown in Table 2.

TABLE 2

|  | Peroxide Value meq/kg | FFA % | Total Carotenes Content ppm | Vit E ppm |
|---|---|---|---|---|
| Pretreated (Degummed) Crude Palm Oil | 0.25 | 3.390 | 552 | 886 |
| Natural carotene & vitamin E rich refined & deod palm oil | Nil | 0.054 | 545 | 865 |
| PFAD | — | 91.0 | 30 | 2124 |

EXAMPLE 3

Pretreated (Degummed) Crude Palm Oil was preheated to 100° C. and degassed in the Degasser at 0.8 mbar pressure and passed through the Short Path Distiller at the rate of 250 kg/hr at a pressure of 0.005 mbar. The distiller temperature was maintained at 175° C. The tempered water temperature to the internal condenser was maintained at 57° C. The refined and deodorized oil was found to have the characteristics as shown in Table 3.

TABLE 3

|  | Peroxide Value meq/kg | FFA % | Total Carotenes Content ppm |
|---|---|---|---|
| Pretreated (Degummed) Crude Palm Oil | 1.0 | 1.415 | 510 |
| Natural carotene & vitamin E rich refined & deod palm oil | Nil | 0.067 | 500 |

EXAMPLE 4

Pretreated (Degummed) Crude Palm Oil was preheated to 100° C. and degassed in the Degasser at 0.8 mbar pressure and passed through the Short Path Distiller at the rate of 550 kg/hr at a pressure of 0.005 mbar. The distiller temperature was maintained at 175° C. The tempered water temperature to the internal condenser was maintained at 57° C. The refined and deodorized oil was found to have the characteristics as shown in Table 4.

TABLE 4

|  | Peroxide Value meq/kg | FFA % | Total Carotenes Content ppm |
|---|---|---|---|
| Pretreated (Degummed) Crude Palm Oil | 2.85 | 0.53 | 610 |
| Natural carotene & vitamin E rich refined & deod palm oil | Nil | 0.060 | 594 |

EXAMPLE 5

Table 5 compares the FFA content of the refined oil using the AU/3 1084/89 process versus the process of the instant invention. Group A shows the amount of FFA present using the process as disclosed in AU'189. The experiment was carried out over 3 days and the highest and lowest percentages of FFA are listed. Group B shows the amount of FFA present using the process of the present invention. The experiment was carried out over 3 days and maximum and minimum values for FFA content are listed. The carotene content of the refined oils derived from both processes was evaluated. The value is expressed as the percentage of carotene that is still present after processing. Comparison of the experimental data illustrates the improved palm oil refining process of the present invention since FFA content is significantly reduced while carotene levels remain high.

TABLE 5

|  | Day 1 | Day 2 | Day 3 |
|---|---|---|---|
| FFA Content (%) | 1.16 max 0.327 min | 1.23 max 0.561 min | 0.863 max 0.619 min |
| Percent of the Carotene Remaining After Refining | >90% | >90% | >90% |
| FFA Content % | 0.072 max 0.052 min | 0.086 max 0.045 min | 0.059 max 0.043 min |
| Percent of the Carotene Remaining After Refining | >90% | >90% | >90%. |

All publications, patents and patent applications mentioned in this specification are herein incorporated by reference into the specification in their entirety for all purposes. Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined and circumscribed by the appended claims.

What is claimed is:

1. A process for the production of a natural carotene rich, refined and deodorized oil, said process comprising:
   a) subjecting crude oil to a pressure of less than 0.060 mbar and a temperature of less than 200° C.;
   b) distilling said crude oil at a commercial scale rate in a short-path distiller at a temperature range between about 160° C. to about 200° C. and at pressures between about 0.003 mbar to about 0.08 mbar to produce a distilled oil and free fatty acid (FFA) mixture; and
   c) removing FFA in the oil by condensation within the distiller to produce a natural carotene rich refined and deodorized oil containing a minimum of 90% of the carotene and vitamin E present in the crude oil and containing less than 0.1% of FFA.

2. A process according to claim 1, wherein said step of removing FFA comprises subjecting the mixture of oil and FFA to an internal condenser operating at a temperature in a range of between the melting point of FFA and a temperature lower than the condensing point of FFA.

3. A process according to claim 2, wherein the temperature of the internal condenser is in the range between about 20° C. to about 80° C.

4. A process according to claim 2, wherein the internal condenser incorporates a flow therethrough of tempered water and wherein the temperature of tempered water is marginally greater than the melting point of FFA.

5. A process according to claim 1, wherein said commercial rate is between about 100 kg/hr to about 3,000 kg/hr.

6. A process according to claim 1, wherein said commercial rate is between about 100 kg/hr to about 5,000 kg/hr.

7. A process according to claim 1, wherein said commercial rate is between about 100 kg/hr to about 15000 kg/hr.

8. A process according to claim 1, wherein said commercial rate is between about 200 kg/hr to about 1000 kg/hr.

9. A process according to claim 8, wherein said oil is degassed in a degasser unit with a reflux condenser.

10. A process according to claim 1, wherein the oil is preheated up to 160° C. and has been degassed.

11. A process according to claim 1, wherein the oil is crude palm oil.

12. A process according to claim 11, wherein the oil is a member selected from the group consisting of degummed oil, degummed palm oil, degunumed palm olein, degummed palm stearin, crude palm olein, crude palm stearin, degummed palm mid-fraction, degummed palm super olein, crude palm mid-fraction, crude palm super olein, crud palm oil and hybrid palm oil.

13. A process according to claim 1, wherein said natural carotene rich, refined and deodorized oil contains a minimum of 90% of the carotene and vitamin E present in the oil before being fed into the distiller.

14. A process according to claim 1, wherein said natural carotene rich, refined and deodorized oil contains a minimum of 500 ppm carotene.

15. A process according to claim 1, wherein said natural carotene rich, refined and, deodorized oil contains a minimum of 800 ppm vitamin E.

16. A process according to claim 1, wherein said natural carotene rich, refined and deodorized oil contains less than 0.1% of FFA.

17. A process according to claim 1, wherein said refined oil includes a maximum of 30 ppm of carotene, a maximum of 1000–2500 ppm vitamin E and a minimum of 90% FFA.

18. A process according to claim 1, further comprising a vacuum system wherein said vacuum system is protected by a plurality of cold traps with different cooling coils and wherein the temperatures can be independently varied between about −15° C. to about +5° C. during operation and up to 60° C. during defrosting.

19. A natural carotene rich refined and deodorized oil produced according to claim 1.

20. A natural carotene rich, refined and deodorized oil according to claim 1, which further comprises naturally occurring vitamin E.

21. A process for the production of a natural carotene rich refined and deodorized oil, said process comprising:
   a) subjecting crude oil to a pressure of less than 0.060 mbar and a temperature of less than 200° C.;
   b) distilling said crude oil at a commercial scale rate of 250 kg/hr in a short-path distiller at a temperature range between about 160° C. to about 200° C. and at pressures between about 0.003 mbar to about 0.08 mbar producing a mixture of distilled oil and free fatty acids (FFA); and
   c) removing FFA in the oil by condensation within the distiller wherein said step of removing FFA comprises subjecting the mixture of distilled oil and FFA to an internal condenser operating at a temperature in a range of between the melting point of FFA and a temperature lower than the condensing point of FFA to produce a carotene rich refined and deodorized oil containing a minimum of 90% of the carotene and vitamin E present in the crude oil and containing less than 0.1% of FFA.

22. A process for the production of a natural carotene rich refined and deodorized oil, said process comprising:
   a) subjecting crude oil to a pressure of less than 0.060 mbar and a temperature of less than 200° C.;
   b) distilling said crude oil at a commercial scale rate of 550 kg/hr in a short-path distiller at a temperature range between about 160° C. to about 200° C. and at pressures between about 0.003 mbar to about 0.08 mbar producing a mixture of distilled oil and free fatty acids (FFA); and
   c) removing FFA in the oil by condensation within the distiller wherein said step of removing FFA comprises subjecting the mixture of distilled oil and FFA to an internal condenser operating at a temperature in a range of between the melting point of FFA and a temperature lower than the condensing point of FFA to produce a carotene rich refined and deodorized oil containing a minimum of 90% of the carotene and vitamin E present in the crude oil and containing less than 0.1% of FFA.

* * * * *